(12) United States Patent
Bray

(10) Patent No.: US 11,927,781 B2
(45) Date of Patent: Mar. 12, 2024

(54) OPTICAL DEVICE

(71) Applicant: BAE SYSTEMS plc, London (GB)

(72) Inventor: Mark Edgar Bray, Chelmsford (GB)

(73) Assignee: BAE SYSTEMS PLC, London (GB)

( * ) Notice: Subject to any disclaimer, the term of this patent is extended or adjusted under 35 U.S.C. 154(b) by 810 days.

(21) Appl. No.: 16/980,921

(22) PCT Filed: Mar. 6, 2019

(86) PCT No.: PCT/GB2019/050631
§ 371 (c)(1),
(2) Date: Sep. 15, 2020

(87) PCT Pub. No.: WO2019/175546
PCT Pub. Date: Sep. 19, 2019

(65) Prior Publication Data
US 2020/0408975 A1    Dec. 31, 2020

(30) Foreign Application Priority Data

Mar. 16, 2018  (EP) ...................................... 18275040
Mar. 16, 2018  (GB) ...................................... 1804202

(51) Int. Cl.
*G02B 5/28* (2006.01)
*G02B 5/26* (2006.01)
(Continued)

(52) U.S. Cl.
CPC ................. *G02B 5/28* (2013.01); *G02B 5/26* (2013.01); *G02B 25/001* (2013.01); *G02B 27/1006* (2013.01); *G02B 27/142* (2013.01)

(58) Field of Classification Search
CPC .. G02B 5/28; G02B 5/282; G02B 5/285–288; G02B 5/26; G02B 25/001;
(Continued)

(56) References Cited

U.S. PATENT DOCUMENTS

| 4,637,678 A | 1/1987 | Moss et al. |
| 5,189,560 A | 2/1993 | Edwards et al. |

(Continued)

FOREIGN PATENT DOCUMENTS

| EP | 0583048 A1 | 4/1994 |
| EP | 3210579 A1 | 8/2017 |

(Continued)

OTHER PUBLICATIONS

International Preliminary Report on Patentability received for PCT Application No. PCT/GB2019/050630, dated Oct. 1, 2020. 8 pages.
(Continued)

*Primary Examiner* — Marin Pichler
(74) *Attorney, Agent, or Firm* — Finch & Maloney PLLC

(57) ABSTRACT

An optical device 10 comprises an objective lens 11 defining a focal plane FP and an eyepiece 12 spaced apart therefrom, defining an optical axis OA therethrough. The optical device 10 comprises an optical member 13 having a first planar face 14, arranged on the optical axis OA proximal the focal plane FP, wherein the first planar face 14 is arranged to oppose the objective lens 11. The optical device 10 comprises a filter assembly 100 comprising a first notch filter 101 arranged to attenuate transmission of electromagnetic radiation having a first wavelength $\lambda_1$, wherein the first notch filter 101 is arranged in front of the optical member 13. The first notch filter 101 is arranged at a first oblique angle $\theta_1$ to the optical axis OA whereby, in use, incident electromagnetic radiation having a predetermined wavelength $\lambda_i$ propagating along the optical axis is reflected by the first notch filter 101 away therefrom, wherein the first wavelength $\lambda_1$ and the predetermined wavelength $\lambda_i$ are different. In this way, retro-reflection of the incident electromagnetic radiation towards a source thereof is reduced, thereby better detection of the optical device 10.

20 Claims, 5 Drawing Sheets

(51) Int. Cl.
*G02B 25/00* (2006.01)
*G02B 27/10* (2006.01)
*G02B 27/14* (2006.01)

(58) Field of Classification Search
CPC .. G02B 25/002; G02B 25/007; G02B 25/008; G02B 27/1006; G02B 27/0189; G02B 27/142; G02B 2027/019; G02B 5/287; G02B 23/14; G02B 27/32; G02B 5/203; F41G 1/00; F41G 1/30; F41G 1/38–387
See application file for complete search history.

(56) References Cited

U.S. PATENT DOCUMENTS

| | | | |
|---|---|---|---|
| 5,745,292 | A | 4/1998 | Jones |
| 6,411,451 | B1 | 6/2002 | Fliss et al. |
| 8,228,591 | B1 | 7/2012 | Towers et al. |
| 2002/0159155 | A1 | 10/2002 | O'Brien |
| 2010/0110515 | A1 | 5/2010 | Blais-Ouellette et al. |
| 2012/0110887 | A1* | 5/2012 | Reimer ............... F41G 1/345 42/132 |
| 2015/0260887 | A1 | 9/2015 | Salisbury et al. |
| 2017/0242244 | A1 | 8/2017 | O'Connell et al. |
| 2020/0284551 | A1* | 9/2020 | Brown ............... G02B 27/34 |

FOREIGN PATENT DOCUMENTS

| | | |
|---|---|---|
| GB | 2548657 A | 9/2017 |
| GB | 2548658 A | 9/2017 |
| GB | 2552551 A | 1/2018 |
| WO | 9723789 | 7/1997 |
| WO | 0227287 A1 | 4/2002 |
| WO | 2012177296 A1 | 12/2012 |
| WO | 2016085767 A1 | 6/2016 |
| WO | 2017163031 A1 | 9/2017 |
| WO | 2017163058 A1 | 9/2017 |
| WO | 2019175545 A1 | 9/2019 |
| WO | 2019175546 A1 | 9/2019 |

OTHER PUBLICATIONS

International Preliminary Report on Patentability received for PCT Application No. PCT/GB2019/050631, dated Oct. 1, 2020. 9 pages.
International Search Report and Written Opinion received for PCT Application No. PCT/GB2019/050630, dated Apr. 25, 2019. 14 pages.
GB Search Report under Section 17(5) received for GB Application No. 1804203.6, dated Sep. 3, 2018. 4 pages.
Extended European Search Report received for EP Application No. 18275041.4, dated Oct. 1, 2018. 8 pages.
Moser, C, and Havermeyer, F., "Ultra-narrow-band tunable laserline notch filter," Applied Physics B; Lasers and Optics, Springer, vol. 95, No. 3, Mar. 3, 2009, pp. 597-601.
International Search Report and Written Opinion received for PCT Application No. PCT/GB2019/050631, dated Apr. 24, 2019. 15 pages.
GB Search Report under Section 17(5) received for GB Application No. 1804202.8, dated Sep. 14, 2018. 4 pages.
Extended European Search Report received for EP Application No. 18275040.6, dated Oct. 18, 2018. 8 pages.

* cited by examiner

OPTICAL DEVICE

FIELD

The present invention relates to optical devices, for example optical sighting devices.

BACKGROUND TO THE INVENTION

Coherent electromagnetic radiation sources, for example lasers, laser lights or laser pointers, may be used to detect optical devices, for example sniper scopes (also known as telescopic sights). The optical devices may retro-reflect at least some of incident electromagnetic radiation from such sources. The retro-flections may be observed as glints or flashes. Hence, by scanning a laser (i.e. a hostile light), for example, and watching for glints, snipers or spotters may be detected by hostile forces. Furthermore, such coherent electromagnetic radiation sources may be used maliciously to harm human users of the optical devices, for example snipers or spotters. The harm may include distraction, dazzle, flash blindness and/or physiological damage.

Hence, there is a need to improve optical devices to reduce likelihood of detection and/or to improve protection of human users.

SUMMARY OF THE INVENTION

It is one aim of the present invention, amongst others, to provide an optical device which at least partially obviates or mitigates at least some of the disadvantages of the prior art, whether identified herein or elsewhere. For instance, it is an aim of embodiments of the invention to provide an optical device that reduces likelihood of detection using coherent electromagnetic radiation sources. For instance, it is an aim of embodiments of the invention to provide an optical filter that improves protection of human users.

A first aspect provides an optical device comprising:
an objective lens defining a focal plane and an eyepiece spaced apart therefrom, defining an optical axis therethrough;
an optical member having a first planar face, arranged on the optical axis proximal the focal plane, wherein the first planar face is arranged to oppose the objective lens; and
a filter assembly comprising a first notch filter arranged to attenuate transmission of electromagnetic radiation having a first wavelength incident normally thereupon, wherein the first notch filter is arranged in front of the optical member; and
wherein the first notch filter is arranged at a first oblique angle to the optical axis;
whereby, in use, incident electromagnetic radiation having a predetermined wavelength propagating along the optical axis is reflected by the first notch filter away therefrom, wherein the first wavelength and the predetermined wavelength are different.

A second aspect provides use of a notch filter in an optical device to reduce retro-reflection of incident light thereon towards a source thereof.

A third aspect provides use of a notch filter in an optical device to attenuate incident light thereon to reduce harm to a user of the optical device.

DETAILED DESCRIPTION OF THE INVENTION

According to the present invention there is provided, as set forth in the appended claims. Also provided is. Other features of the invention will be apparent from the dependent claims, and the description that follows.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

The first aspect provides an optical device comprising:
an objective lens defining a focal plane and an eyepiece spaced apart therefrom, defining an optical axis therethrough;
an optical member having a first planar face, arranged on the optical axis proximal the focal plane, wherein the first planar face is arranged to oppose the objective lens; and
a filter assembly comprising a first notch filter arranged to attenuate transmission of electromagnetic radiation having a first wavelength incident normally thereupon, wherein the first notch filter is arranged in front of the optical member; and
wherein the first notch filter is arranged at a first oblique angle to the optical axis;
whereby, in use, incident electromagnetic radiation having a predetermined wavelength propagating along the optical axis is reflected by the first notch filter away therefrom, wherein the first wavelength and the predetermined wavelength are different.

In this way, the optical device reduces likelihood of detection since the first notch filter is arranged at the first oblique angle to the optical axis to avoid retro-reflection of the filtered (i.e. reflected) electromagnetic radiation back towards a source thereof. Furthermore, in this way, the optical device improves protection of a human user since the first notch filter is arranged at the first oblique angle to the optical axis to reflect the incident electromagnetic radiation away therefrom, thereby preventing transmission of the incident electromagnetic radiation through the optical device, particularly the eyepiece, towards the human user. That is, the optical device both reduces likelihood of detection by and improves protection of the human user from incident electromagnetic radiation, for example lasers.

In this way, in use, incident electromagnetic radiation having the predetermined wavelength propagating along the optical axis is reflected by the first notch filter away therefrom, wherein the first wavelength and the predetermined wavelength are different. Particularly, while the first notch filter is arranged to attenuate transmission of electromagnetic radiation having the first wavelength incident normally thereupon, by arranging the first notch filter at the first oblique angle to the optical axis, the first notch filter reflects incident electromagnetic radiation having the predetermined wavelength transmitted due, at least in part, to blue shift, as described below.

The inventors have found that reflections from non-flat optical members (i.e. optical members having non-planar surfaces, for example concave or convex surfaces) are dissipated, for example diverged over a large area, due to their curvatures, thereby reducing their effective detection cross-sections by reducing the returned power to the sources. These reflections from the non-flat optical members are generally not problematic.

However, the inventors have found that reflections from flat optical members (i.e. optical members having at least one planar face) may be strong, such that returned power to the sources may be sufficient for detection. Reticles (also known as reticules or graticules) are optical members typically having at least one planar face and are typically included in optical sighting devices, for example sniper scopes, at a relayed focus (i.e. proximal the focal plane of the objective lens). Hence, such reticles may strongly retro-reflect incident laser light, thereby allowing detection, while some of the incident laser light may also be transmitted through the optical sighting devices, thereby harming the human users.

In contrast to conventional optical devices, the first notch filter of the optical device of the first aspect speculary reflects incident laser light, for example, at an angle away from the source, thereby reducing retro-reflection. This deliberate reflection both stops laser dazzle of the sniper, and retro-reflection disclosing the snipers location, for example. Note that the first notch filter may further reduce retro-reflection since the incident laser light may be transmitted twice through the first notch filter—upon initial incidence and subsequently, following reflection by the flat optical member.

Particularly, the first notch filter is arranged to reflect a narrow bandwidth of light incident electromagnetic radiation. Since a capture angle of the optical device is narrow, determined at least in part by a size such as a diameter of the objective lens, in conjunction with the first oblique angle to the optical axis of the first notch filter, the first notch filter may be arranged to have a fixed red shift of the bandwidth, compared to normal incidence, to compensate for a blue shift due to tilting by the first oblique angle to the optical axis.

Furthermore, since the first notch filter attenuates, for example blocks, only a narrow bandwidth of incident electromagnetic radiation, the visible light transmission is high, so the human user still has good visibility, for example of a target. In addition, since the first notch filter attenuates, for example blocks, only a narrow bandwidth of incident electromagnetic radiation, colouration due to the first notch filter is low, so the human user still has good colour visibility.

The optical device comprises the objective lens defining the focal plane and the eyepiece spaced apart therefrom, defining the optical axis therethrough. That is, the objective lens is arranged at one end of the optical device and the eyepiece is arranged at an opposed end of the optical device. In use, light from an object enters the optical device via the objective lens, an image of the object is magnified by the optical device and the magnified image viewed by a human user via the eyepiece (i.e. by an eye of the human user). In one example, a user of the optical device is a human user. In one example, a user of the optical device is a non-human user, for example a detector such as a charge-coupled device (CCD) or complementary metal-oxide semiconductor (CMOS) detector. While human users may be susceptible to harm, as described above, such detectors may also be susceptible to damage due to hostile lights.

In one example, the objective lens has a diameter in a range from 10 mm to 100 mm, preferably in a range from 20 mm to 80 mm, more preferably in a range from 30 mm to 70 mm. In one example, the objective lens has a focal length in a range from 25 mm to 300 mm, preferably in a range from 50 mm to 200 mm. In one example, the objective lens comprises one convex surface. In one example, the objective lens comprises two mutually opposed convex surfaces. In one example, the objective lens is uncoated. In one example, the objective lens is coated, for example with an anti-reflective and/or an antiglare coating. In one example, the objective lens comprises a plurality of optical elements.

In one example, the eyepiece (also known as an ocular lens) is adjustable, allowing fine focus for example.

The optical device comprises the optical member having the first planar face, arranged on the optical axis proximal the focal plane, wherein the first planar face is arranged to oppose the objective lens. That is, a plane of the optical member normal to the first planar face is parallel to the focal plane. In other words, the first planar face is substantially parallel to an opposed face of the objective lens. It should be understood that the optical member is a transparent or a substantially transparent optical member.

In one example, the optical member has a second planar face opposed to the first planar face. That is, the optical member may have two opposed planar faces, for example two opposed planar parallel faces. In one example, the optical member comprises and/or is a flat disc.

In one example, the optical member is a reticle. A reticle for a telescopic sight typically includes sighting elements provided thereon, for example crosshairs, target dots or rangefinders, to assist accurate targeting of a target.

The optical device comprises the filter assembly comprising the first notch filter arranged to attenuate transmission of electromagnetic radiation having the first wavelength incident normally thereupon, wherein the first notch filter is arranged in front of the optical member.

That is, the first notch filter reduces transmission therethrough of the electromagnetic radiation having the first wavelength incident normally thereupon. Since the first notch filter is in front of the optical member, a reduced intensity of the electromagnetic radiation having the first wavelength incident normally thereupon may be incident on the optical member.

In one example, the first notch filter has a first optical density of at least 1, preferably at least 2, more preferably at least 3. That is, the first notch filter attenuates electromagnetic radiation having the first wavelength incident normally thereupon to at most 10%, at most 1% and at most 0.1% of the incident power, respectively.

In one example, the first notch filter is arranged in front of the objective lens. For example, the filter assembly the first notch filter may be provided as an attachment to the optical device in front of the objective lens. In this way, the filter assembly may also protect the objective lens from physical damage.

In one example, the first notch filter is arranged between the optical member and the objective lens. That is, the filter assembly including the first notch filter may be arranged within the optical device, for example wholly within or partly within the optical device, for example integrated within the optical device. In this way, the filter assembly may be protected from physical damage.

In one example, the first notch filter is arranged to extend across the optical element, for example completely across. In this way, the first notch filter may attenuate all electromagnetic radiation having the first wavelength incident normally thereupon that would otherwise be incident upon the optical member.

In one example, the first notch filter is arranged to attenuate electromagnetic radiation having a first wavelength range including the first wavelength. That is, the first notch filter reduces transmission therethrough of electromagnetic radiation having a range of wavelengths including the first wavelength, for example a bandwidth around and/or including the first wavelength.

In one example, the first wavelength range is at most 30 nm, preferably at most 20 nm, more preferably at most 10 nm.

In one example, the first notch filter has a bandwidth in a range from 1 nm to 50 nm, preferably in a range from 2 nm to 20 nm, more preferably in a range from 5 nm to 10 nm.

The first notch filter is arranged at the first oblique angle to the optical axis. That is, the first notch filter is arranged transversely to the optical axis at the first oblique angle, wherein the first oblique angle is measured between the optical axis and a surface of the first notch filter.

In one example, the first oblique angle is in a range from 5° to 85°, preferably in a range from 15° to 60°, more preferably in a range from 20° to 45°, for example 30°. In this way, the first notch filter may reflect incident electromagnetic radiation having the predetermined wavelength away from a source thereof, for example into an internal wall of the optical device or relatively more proximal the optical device.

In one example, the first oblique angle is adjustable. In this way, the first notch filter may be adjusted according to the situation, for example elevation, distance from target, predetermined and/or potential electromagnetic radiation sources, so as to reduce likelihood of detection and/or harm. In one example, the filter assembly including the first notch filter is adjustable whereby the first oblique angle is adjustable.

In one example, in use, incident electromagnetic radiation having the predetermined wavelength transmitted through the objective lens is reflected by the first notch filter away therefrom, wherein the first wavelength and the predetermined wavelength are different.

In one example, the predetermined wavelength is in a range from 100 nm to 2000 nm, preferably in a range from 380 nm to 760 nm for example 445 nm, 532 nm or 650 nm (i.e. visible light) and/or in a range from 760 nm to 1100 nm (i.e. infra red).

Typically, laser pointers used for detection are sources of electromagnetic radiation having predetermined wavelengths of 445 nm, 532 nm or 650 nm. Some diode sources are sources of electromagnetic radiation having predetermined wavelengths in a range from 1500 nm to 1600 nm.

As described above, in use, incident electromagnetic radiation having the predetermined wavelength propagating along the optical axis is reflected by the first notch filter away therefrom, wherein the first wavelength and the predetermined wavelength are different. Particularly, while the first notch filter is arranged to attenuate transmission of electromagnetic radiation having the first wavelength incident normally thereupon, by arranging the first notch filter at the first oblique angle to the optical axis, the first notch filter reflects incident electromagnetic radiation having the predetermined wavelength transmitted due, at least in part, to red shift or blue shift, for example.

Expressing the first oblique angle $\theta$ in radians, the wavelength of attenuation, for example blocking, is blue shifted according to Equation 1:

$$\lambda(\theta) = \lambda(0)\sqrt{1 - \left(\frac{\sin(\theta)}{n_{eff}}\right)^2}$$

where $n_{eff}$ is the effective refractive index and $\lambda(\theta)$ is the first wavelength, incident normally to the first notch filter.

The first notch filter is arranged at the first oblique angle $\theta$ to the optical axis. Therefore, the nominal wavelength needs to be red shifted by a value $\lambda(0) - \lambda(\theta)$ so as to counter the blue shift determined according to Equation 1.

Table 1 shows red shifts calculated from Equation 1 as a function of $\theta$ for $\lambda(0) = 532$ nm and $n_{eff} = 1.5$.

TABLE 1 red shifts calculated from Equation 1 as a function of $\theta$ for $\lambda(0) = 532$ nm and $n_{eff} = 1.5$.

| $\theta$ | Red shift (nm) |
|---|---|
| −80° | 130.7 |
| −70° | 117.3 |
| −60° | 97.6 |
| −50° | 74.6 |
| −40° | 51.3 |
| −30° | 30.4 |
| −20° | 14.0 |
| −10° | 3.6 |
| 0° | 0.0 |
| 10° | 3.6 |
| 20° | 14.0 |
| 30° | 30.4 |
| 40° | 51.3 |
| 50° | 74.6 |
| 60° | 97.6 |
| 70° | 117.3 |
| 80° | 130.7 |

In one example, a difference between the predetermined wavelength and the first wavelength is in a range from 0.1 nm to 150 nm, preferably in a range from 1 nm to 100 nm, more preferably in a range from 10 nm to 50 nm, most preferably in a range from 14 nm to 31 nm. For example, for the most preferred range of 14 nm to 31 nm, reflection of hostile light having the predetermined wavelength is provided for a cone of incidence (i.e. a range of angles of incidence) having a cone angle of approximately 20° to 40°. For some applications, smaller cone angles may be suitable for example in a range from 5° to 30° or less, for example in a range from 5° to 15°.

In one example, the filter assembly comprises a first set of first notch filters, including the first notch filter, arranged to attenuate electromagnetic radiation having respective first wavelengths, including the first wavelength. In this way, detection may be avoided from and/or protection provided from electromagnetic radiation having multiple predetermined wavelengths, for example from laser pointers having predetermined wavelengths of 445 nm, 532 nm or 650 nm.

In one example, the filter assembly comprises a second notch filter arranged to attenuate electromagnetic radiation having a second wavelength, wherein the first wavelength, the second wavelength and the predetermined wavelength are different. In this way, detection may be avoided from and/or protection provided from electromagnetic radiation having multiple predetermined wavelength simultaneously, for example from multiple laser pointers having predetermined wavelengths of 445 nm, 532 nm or 650 nm.

In one example, the optical device comprises a releasable coupling member arranged to releasably couple the filter assembly to the optical device. In this way, the filter assembly may be removed and replaced with a different filter assembly, for example having a different first notch filter arranged to attenuate electromagnetic radiation having a different first wavelength.

In one example, the optical device is an optical sighting device, for example a telescopic sight for a rifle, a spotting device for a spotter, a telescope, binoculars or a periscope.

The second aspect provides use of a notch filter in an optical device to reduce retro-reflection of incident light thereon towards a source thereof.

The third aspect provides use of a notch filter in an optical device to attenuate incident light thereon to reduce harm to a user of the optical device.

In one example, a user of the optical device is a human user. In one example, a user of the optical device is a non-human user, for example a detector such as a charge-coupled device (CCD) or complementary metal-oxide semiconductor (CMOS) detector. While human users may be susceptible to harm, as described above, such detectors may also be susceptible to damage due to hostile lights.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figure 1:
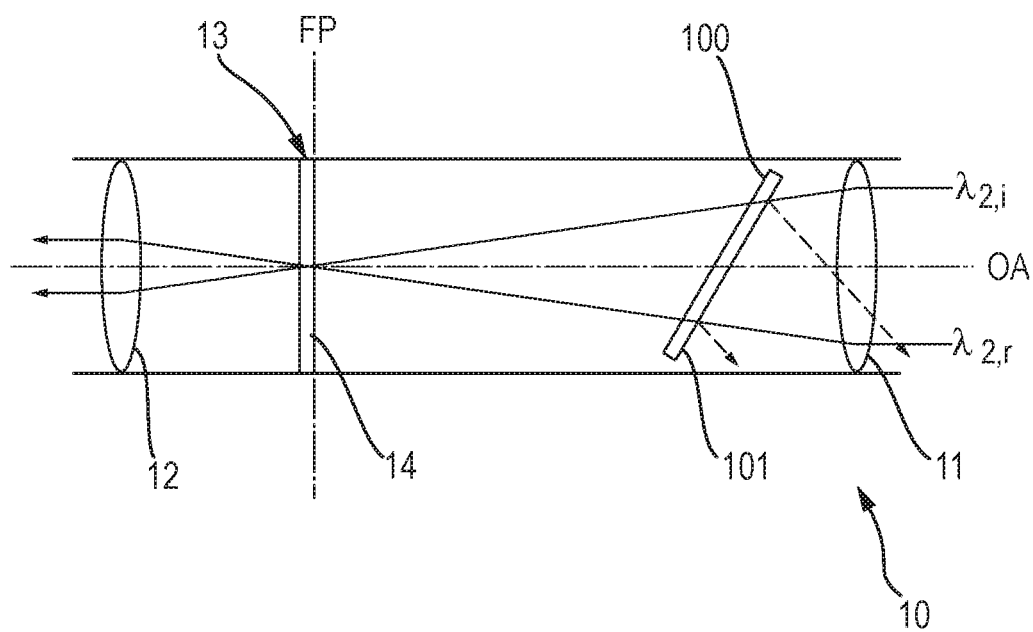
FIG. 1 schematically depicts an optical device according to an exemplary embodiment.

FIG. 1 schematically depicts an optical device 10 according to an exemplary embodiment. Particularly, FIG. 1 shows a ray diagram of the optical device 10.

The optical device 10 comprises an objective lens 11 defining a focal plane FP and an eyepiece 12 spaced apart therefrom, defining an optical axis OA therethrough. The optical device 10 comprises an optical member 13 having a first planar face 14, arranged on the optical axis OA proximal the focal plane FP, wherein the first planar face 14 is arranged to oppose the objective lens 11. The optical device 10 comprises a filter assembly 100 comprising a first notch filter 101 arranged to attenuate transmission of electromagnetic radiation having a first wavelength $\lambda_1$, wherein the first notch filter 101 is arranged in front of the optical member 13.

The first notch filter 101 is arranged at a first oblique angle $\theta_1$ to the optical axis OA whereby, in use, incident electromagnetic radiation having a predetermined wavelength $\lambda_i$ propagating along the optical axis is reflected by the first notch filter 101 away therefrom, wherein the first wavelength $\lambda_1$ and the predetermined wavelength $\lambda_i$ are different. In this way, retro-reflection of the incident electromagnetic radiation (shown in the ray diagram as $\lambda_r$) towards a source thereof is reduced, thereby reducing likelihood of detection of the optical device 10.

Figure 2:
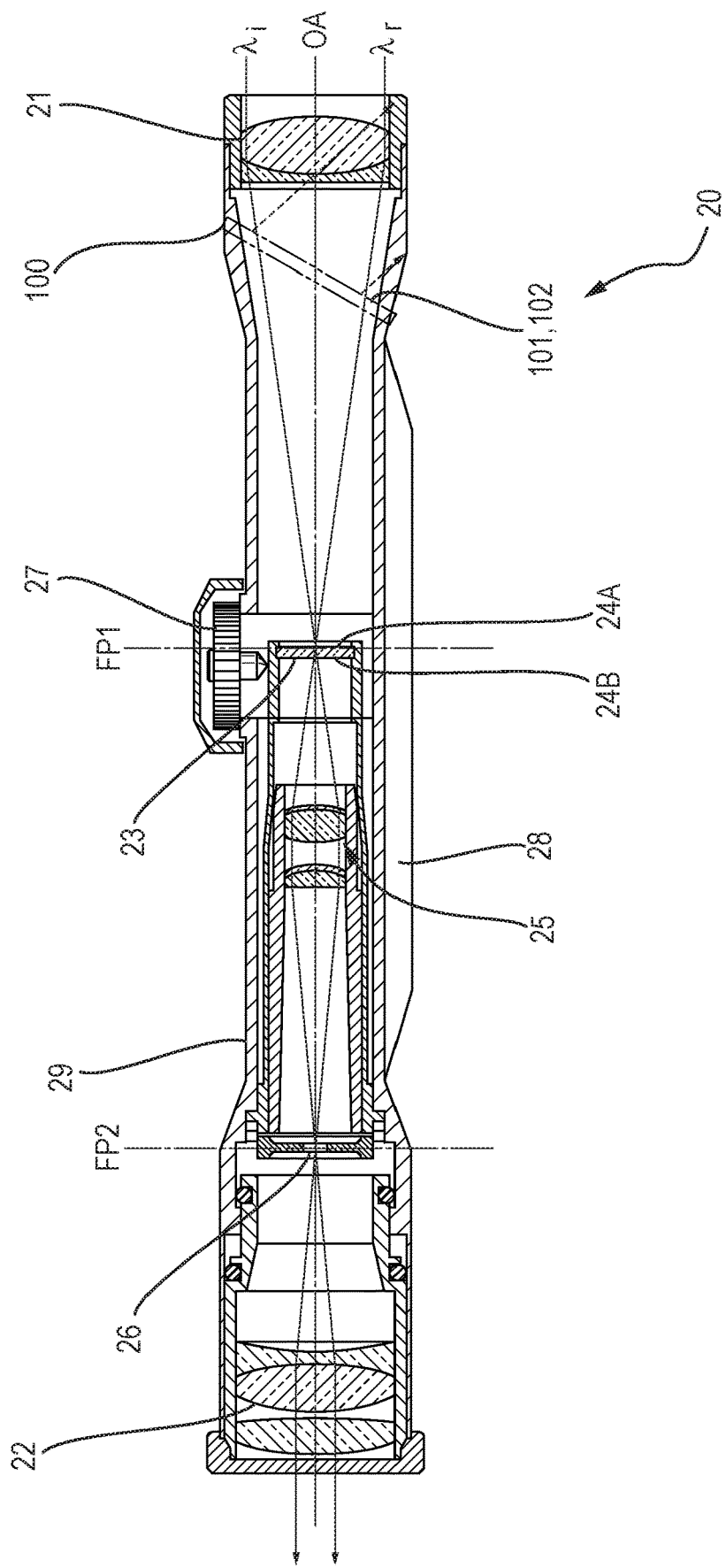
FIG. 2 schematically depicts an optical device according to an exemplary embodiment.

FIG. 2 schematically depicts an optical device 20 according to an exemplary embodiment. Particularly, FIG. 1 shows a ray diagram of the optical device 10.

The optical device 20 comprises an objective lens 21 defining a first focal plane FP1 and an eyepiece 22 spaced apart therefrom, defining an optical axis OA therethrough. The optical device 20 comprises an optical member 23 having a first planar face 24, arranged on the optical axis OA proximal the focal plane FP, wherein the first planar face 24 is arranged to oppose the objective lens 21. The optical device 10 comprises a filter assembly 100 comprising a first notch filter 101 arranged to attenuate transmission of electromagnetic radiation having a first wavelength $\lambda_1$, wherein the first notch filter 101 is arranged in front of the optical member 23. The first notch filter 101 is arranged at a first oblique angle $\theta_1$ to the optical axis OA whereby, in use, incident electromagnetic radiation having a predetermined wavelength $\lambda_i$ propagating along the optical axis is reflected by the first notch filter 101 away therefrom, wherein the first wavelength $\lambda_1$ and the predetermined wavelength $\lambda_{iare}$ different. In this way, retro-reflection of the incident electromagnetic radiation (shown in the ray diagram as $\lambda_r$) towards a source thereof is reduced, thereby better detection of the optical device 20.

In this example, the first notch filter 101 is arranged between the optical member 23 and the objective lens. In this example, the first oblique angle $\theta_1$ is in a range from 15° to 60°.

In this example, the filter assembly 100 comprises a second notch filter 102 arranged to attenuate electromagnetic radiation having a second wavelength $\lambda_2$, wherein the first wavelength $\lambda_1$, the second wavelength $\lambda_2$ and the predetermined wavelength $\lambda_i$ are different.

In this example, the predetermined wavelength $\lambda_i$ is in a range from 400 nm to 700 nm, for example 445 nm, 532 nm or 650 nm.

In this example, the first notch filter 101 has a first optical density of at least 2. In this example, the second notch filter 102 has a second optical density of at least 2.

In this example, the optical member 23 has a second planar face 24B opposed to the first planar face 24A. In this example, the optical member 23 is a reticle.

In this example, the optical device 20 is an optical sighting device, specifically a telescopic sight for a rifle.

In this example, the optical device 20 comprises a picture reversal assembly 25, arranged on the optical axis OA between the optical member 23 and the eyepiece 22 and defining a second focal plane FP2. In this example, the optical device 20 comprises am aperture assembly 26, arranged on the optical axis OA between the picture reversal assembly 25 and the eyepiece 22, proximal the second focal plane FP2. In this example, the optical device 20 comprises an elevation adjustment drum 27 including a protection cap. In this example, the optical device 20 comprises a mounting rail 28 for a rifle. In this example, the optical device 20 comprises a housing 29 (also known as a body or tube) arranged to house the components of the optical device 20.

Figure 3:
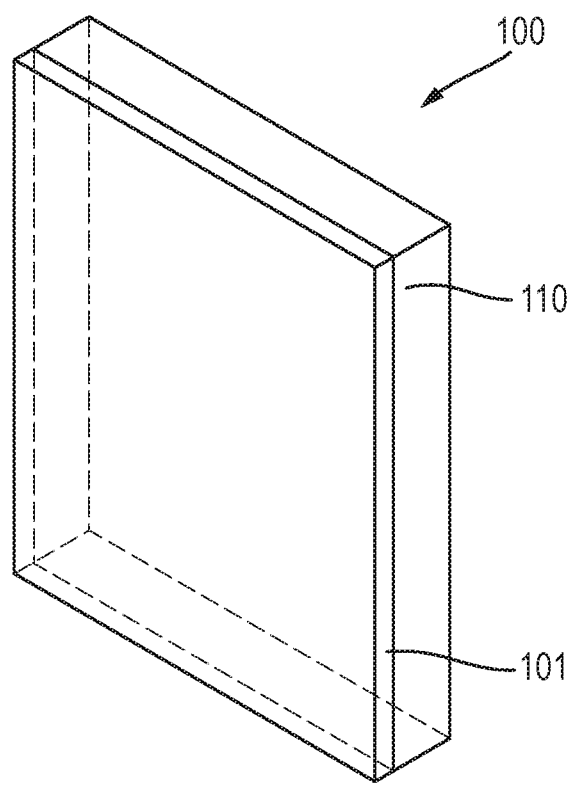
FIG. 3 schematically depicts a filter assembly for an optical device according to an exemplary embodiment.

FIG. 3 schematically depicts the filter assembly 100 for the optical device 10, 20 according to an exemplary embodiment.

The first notch filter 101 is provided as a layer applied to a first face of a substrate 110 to provide the filter assembly 100 adapted for mitigating laser threats such as dazzle. The substrate 110 is substantially transmissive of visible light (for example it may have a visible light transmission (VLT %) of around 90% of normally incident light) and may be formed for example from a glass or a plastics material such as polycarbonate.

The first notch filter 101 is an interference filter formed by holographically exposing a photosensitive film with a plurality of lasers having a set of predetermined wavelengths within a selected wavelength band of bandwidth 10 nm or less.

Conformable photosensitive (e.g. polymeric) films for use in exemplary embodiments of the present invention will be known to a person skilled in the art, and the present invention is not necessarily intended to be limited in this regard. Such photosensitive polymeric films are provided having varying degrees of inherent visible light transmission (VLT), ranging from less than 70% (and possibly, therefore, having a coloured tinge) up to 99% or more (and being substantially colourless and transparent). In respect of the present invention, suffice it to say that a photosensitive flexible/conformable (e.g. polymeric) film is selected having an inherent VLT of, for example, at least 85%. The film typically has a thickness of 1 to 100 micrometers. Thinner, currently known, films may not achieve useful optical densities. Indeed, in respect of currently known photosensitive polymeric films, the degree to which a selected radiation wavelength can be blocked (i.e. the effectiveness of a filter region formed therein) is determined by the thickness and refractive modulation index of the film and, also, by the optical design. Thus, the filter region thickness is ideally matched to the application and the potential power of the source from which protection is required (which may be dictated, at least to some extent, by the minimum distance from the target platform the laser threat may realistically be located and this, in turn, is dictated by application). In general, thicker films and films with higher refractive modulation indices would be selected if it were required to provide protection from higher power radiation sources or to provide greater angular coverage, but this might then have a detrimental effect on the inherent VLT of the film, so a balance is selected to meet the needs of a specific application.

Thus, once the film has been selected, the required holographic exposure thereof is effected to form the filter regions of a required notch filter region to be provided thereon, as described below with reference to FIG. 4.

Figure 4:
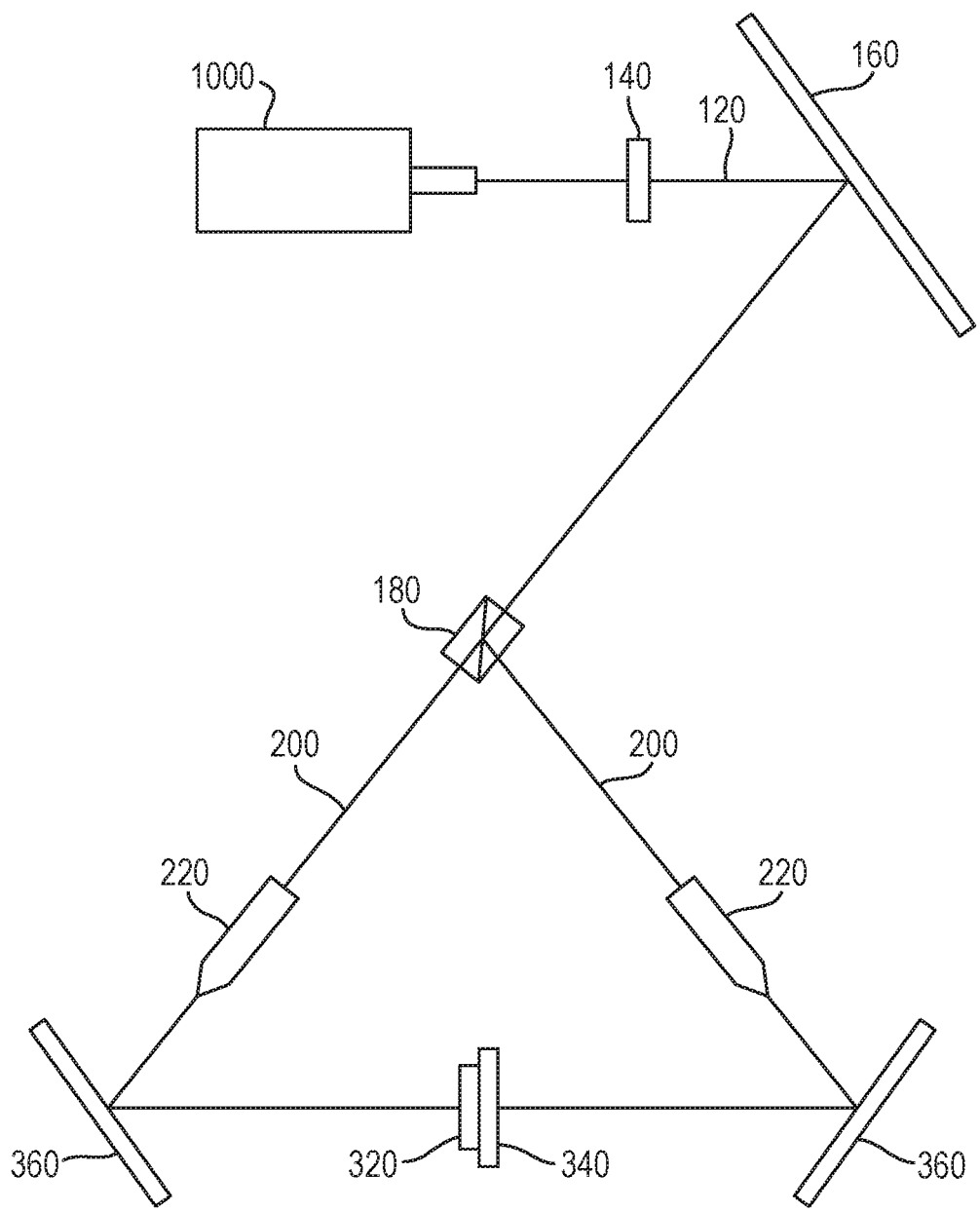
FIG. 4 schematically depicts a method of providing a filter assembly for an optical device according to an exemplary embodiment.

FIG. 4 schematically depicts a method of providing the filter assembly 100 for the optical device 10, 20 according to an exemplary embodiment.

Particularly, as shown in FIG. 4, distinct filter regions defining a notch filter region of a predetermined bandwidth (for example 5-10 nm) may be formed by exposing the film to the intersection of two counter propagating laser beams for each of a set of laser wavelengths within the selected wavelength band having a selected spectral bandwidth. Each laser 1000 (of a wavelength within the selected spectral bandwidth) produces a laser beam 120 which is controlled by a shutter 140. The laser beam 120 is directed by a mirror 160 into a beam splitter 180 wherein the beam is divided into equal beam segments 200. Each beam segment 200 passes through a microscope objective 220 and is then reflected by a respective mirror 360 onto the photosensitive polymer film 320. Other optical devices (not shown) may be provided between the microscope objective 220 and the mirror 360 to, for example, focus or diverge the respective beam segments 200, as required. Furthermore, masking or other limiting techniques may be utilised to limit the extent or thickness to which the film is exposed to the beam segments 200, as will be understood by a person skilled in the art. As a specific (non limiting) example, if it is required to provide a notch filter region of bandwidth 5 nm around 520 nm, then a plurality of lasers 1000 may be used to produce the notch filter region of (purely by way of example) 517.5 nm, 518 nm, 518.5 nm, 519 nm, 519.5 nm, 520 nm, 520.5 nm, 521 nm, 521.5 nm, 522 nm and 522.5 nm. The above-described exposure process may be performed consecutively for each of these laser wavelengths or, in other exemplary embodiments, the exposures may be performed substantially simultaneously. Other apparatus for forming a holographic filter region at each specified wavelength is known and could, alternatively, be used.

Once the exposure process has been completed, the resultant hologram can be fixed by, for example, a bleaching process.

Figure 5:
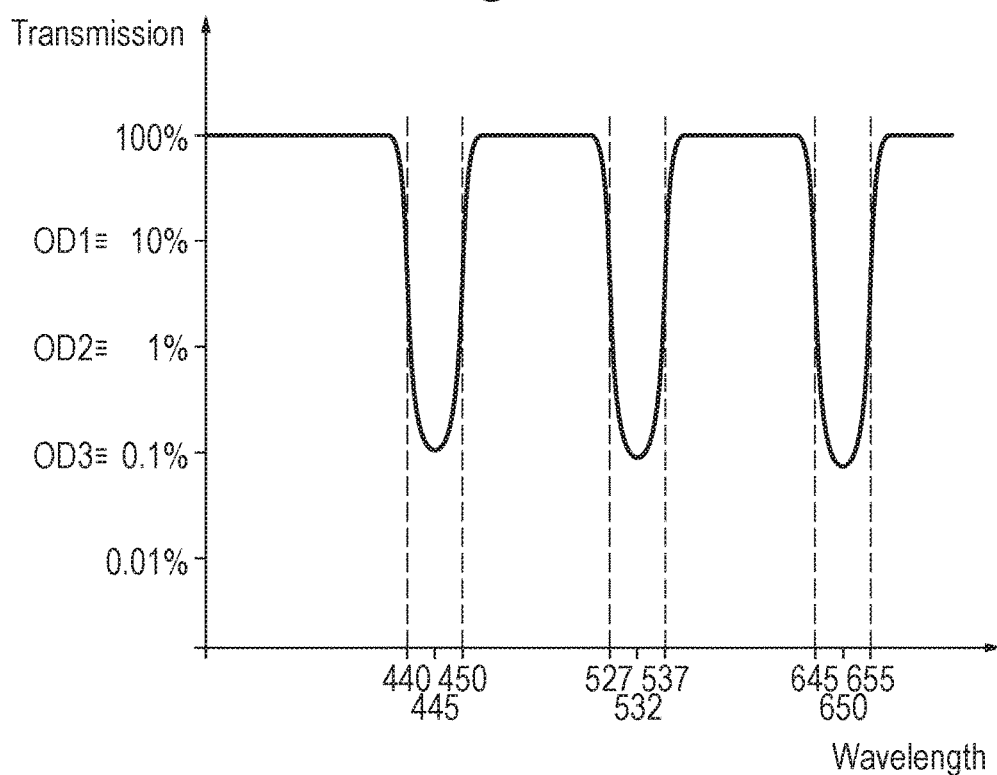
FIG. 5 schematically depicts transmission characteristics of a filter assembly for an optical device according to an exemplary embodiment.

FIG. 5 schematically depicts transmission characteristics of the filter assembly 100 for the optical device 10, 20 according to an exemplary embodiment.

Particularly, FIG. 5 shows the transmission characteristics (which may alternatively be referred to as the transfer function) of visible electromagnetic radiation incident on the first notch filter 101. The transmission intensity relative to incident radiation intensity is shown on the y-axis and the wavelength of the incident radiation is shown on the x-axis.

As can be seen on the plot, across the range of wavelengths the intensity of the transmitted radiation is close to 100% of that which is incident. In general, a VLT % of 90% would be acceptable if 100% were not feasible.

There are three distinct notches in the transmission characteristic associated with three wavelength bands. These are in particular a 10 nm band centred on 455 nm, a 10 nm band centred on 532 nm and a 10 nm band centred on 650 nm. In general any three notches from the group consisting of 405 nm, 455 nm, 520 nm, 532 nm, and 650 nm may be selected. Further, notches may be chosen to coincide with any expected laser threat wavelength and/or expected red shift to compensate for blue shift due to the angle of inclination. Still further, the bandwidth may be 5 nm.

At the centre of each of these bands, the intensity of the transmitted radiation is at a minimum and has an optical density of approximately 3, which is equivalent to 0.1% of the initially incident radiation.

Figure 6:
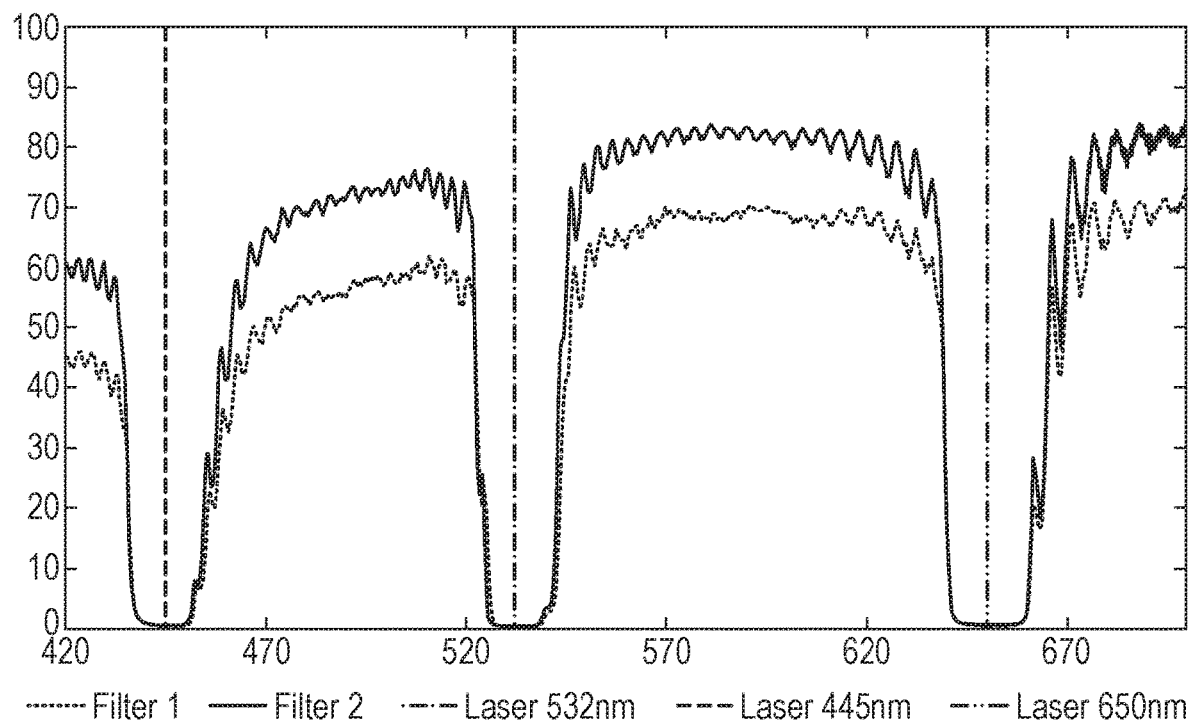
FIG. 6 schematically depicts transmission characteristics of a filter assembly for an optical device according to an exemplary embodiment.

FIG. 6 schematically depicts transmission characteristics of a filter assembly for an optical device according to an exemplary embodiment.

Particularly, FIG. 6 shows the measured transmission characteristics of visible electromagnetic radiation incident on the first notch filter 101. The transmission intensity relative to incident radiation intensity is shown on the y-axis and the wavelength of the incident radiation is shown on the x-axis, as described with reference to FIG. 5.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. An optical device comprising:
an objective lens defining a focal plane and an eyepiece spaced apart therefrom, defining an optical axis therethrough;
an optical member having a planar face, arranged on the optical axis proximal the focal plane and between the objective lens and the eyepiece, wherein the planar face is arranged to oppose the objective lens; and
a filter assembly comprising a notch filter arranged to attenuate transmission of electromagnetic radiation having a first wavelength incident thereupon, wherein the notch filter is arranged in front of the optical member; and
wherein the notch filter is arranged between the optical member and the objective lens, and at an oblique angle to the optical axis;
whereby, in use, incident electromagnetic radiation having a predetermined wavelength propagating along the optical axis is reflected by the notch filter away therefrom, wherein the first wavelength and the predetermined wavelength are different.

2. The optical device according to claim 1, wherein the notch filter is arranged to attenuate electromagnetic radiation having a wavelength range including the first wavelength.

3. The optical device according to claim 2, wherein the first wavelength range is at most 30 nm.

4. The optical device according to claim 1, wherein the filter assembly comprises a set of notch filters, including the notch filter, arranged to attenuate electromagnetic radiation having respective first wavelengths, including the first wavelength.

5. The optical device according to claim 1, wherein the oblique angle is in a range from 5° to 85°.

6. The optical device according to claim 1, wherein the notch filter is a first notch filter, and wherein the filter assembly further comprises a second notch filter arranged to attenuate electromagnetic radiation having a second wavelength, wherein the first wavelength, the second wavelength and the predetermined wavelength are different.

7. The optical device according to claim 1, wherein the predetermined wavelength is in a range from 100 nm to 1100 nm.

8. The optical device according to claim 1, wherein a difference between the predetermined wavelength and the first wavelength is in a range from 0.1 nm to 150 nm.

9. The optical device according to claim 1, wherein the notch filter has a first optical density of at least 2.

10. The optical device according to claim 1, wherein the planar face is a first planar face, and wherein the optical member has a second planar face opposed to the first planar face.

11. The optical device according to claim 10, wherein the optical member is a reticle.

12. The optical device according to claim 1, wherein the optical device comprises a releasable coupling member arranged to releasably couple the filter assembly to the optical device.

13. The optical device according to claim 1, wherein the oblique angle is adjustable.

14. The optical device according to claim 1, wherein:
the objective lens is on a first side of the notch filter;
the eyepiece and the optical member are on a second side of the notch filter that is opposite the first side; and
the electromagnetic radiation having the predetermined wavelength is incident on the notch filter from the first side.

15. A method comprising:
arranging (i) an objective lens that defines a focal plane and (ii) an eyepiece spaced apart from the objective lens, wherein the objective lens and/or the eyepiece defines an optical axis;
arranging an optical member having a planar face between the objective lens and the eyepiece, wherein the planar face is arranged to oppose the objective lens;
arranging a filter assembly comprising a notch filter to attenuate transmission of electromagnetic radiation having a first wavelength incident thereupon, the notch filter is arranged in front of the optical member, wherein the notch filter is arranged between the optical member and the objective lens, and at an oblique angle to the optical axis; and
reflecting, by the notch filter, incident electromagnetic radiation having a predetermined wavelength propagating along the optical axis away therefrom, wherein the first wavelength and the predetermined wavelength are different.

16. An optical device comprising:
an objective lens defining a focal plane and an eyepiece spaced apart therefrom, defining an optical axis therethrough;
an optical member having a planar face, arranged on the optical axis proximal the focal plane, wherein the planar face is arranged to oppose the objective lens; and
a filter assembly comprising a notch filter arranged to attenuate transmission of electromagnetic radiation having a first wavelength incident thereupon, wherein the notch filter is arranged in front of the optical member and arranged between the optical member and the objective lens;
wherein the notch filter is arranged at an oblique angle to the optical axis, and to attenuate electromagnetic radiation having a wavelength range including the first wavelength, wherein the wavelength range is at most 30 nm, wherein the oblique angle is in a range from 5° to 85°;
wherein incident electromagnetic radiation having a predetermined wavelength propagating along the optical axis is reflected by the notch filter away therefrom;

wherein the first wavelength and the predetermined wavelength are different;

wherein the predetermined wavelength is in a range from 100 nm to 1100 nm; and wherein a difference between the predetermined wavelength and the first wavelength is in a range from 0.1 nm to 150 nm.

17. The optical device according to claim 16, wherein: the wavelength range is at most 20 nm; the oblique angle is in a range from 15° to 60°; the predetermined wavelength is in a range from 380 nm to 760 nm; and the difference between the predetermined wavelength and the first wavelength is in a range from 1 nm to 100 nm.

18. The optical device according to claim 16, wherein: the wavelength range is at most 10 nm; the oblique angle is in a range from 20° to 45°; the predetermined wavelength is in a range from 760 nm to 1100 nm; and the difference between the predetermined wavelength and the first wavelength is in a range from 10 to 50 nm.

19. The optical device according to claim 16, wherein: the wavelength range is at most 20 nm; the oblique angle is in a range from 15° to 60°; the predetermined wavelength is in a range from 380 nm to 1100 nm; and the difference between the predetermined wavelength and the first wavelength is in a range from 1 nm to 100 nm.

20. The optical device according to claim 16, wherein: the wavelength range is at most 10 nm; the oblique angle is in a range from 20° to 45°; the predetermined wavelength is in a range from 380 nm to 1100 nm; and the difference between the predetermined wavelength and the first wavelength is in a range from 10 to 50 nm.

\* \* \* \* \*